C. E. BROOKS.
CHUCK.
APPLICATION FILED SEPT. 12, 1908.

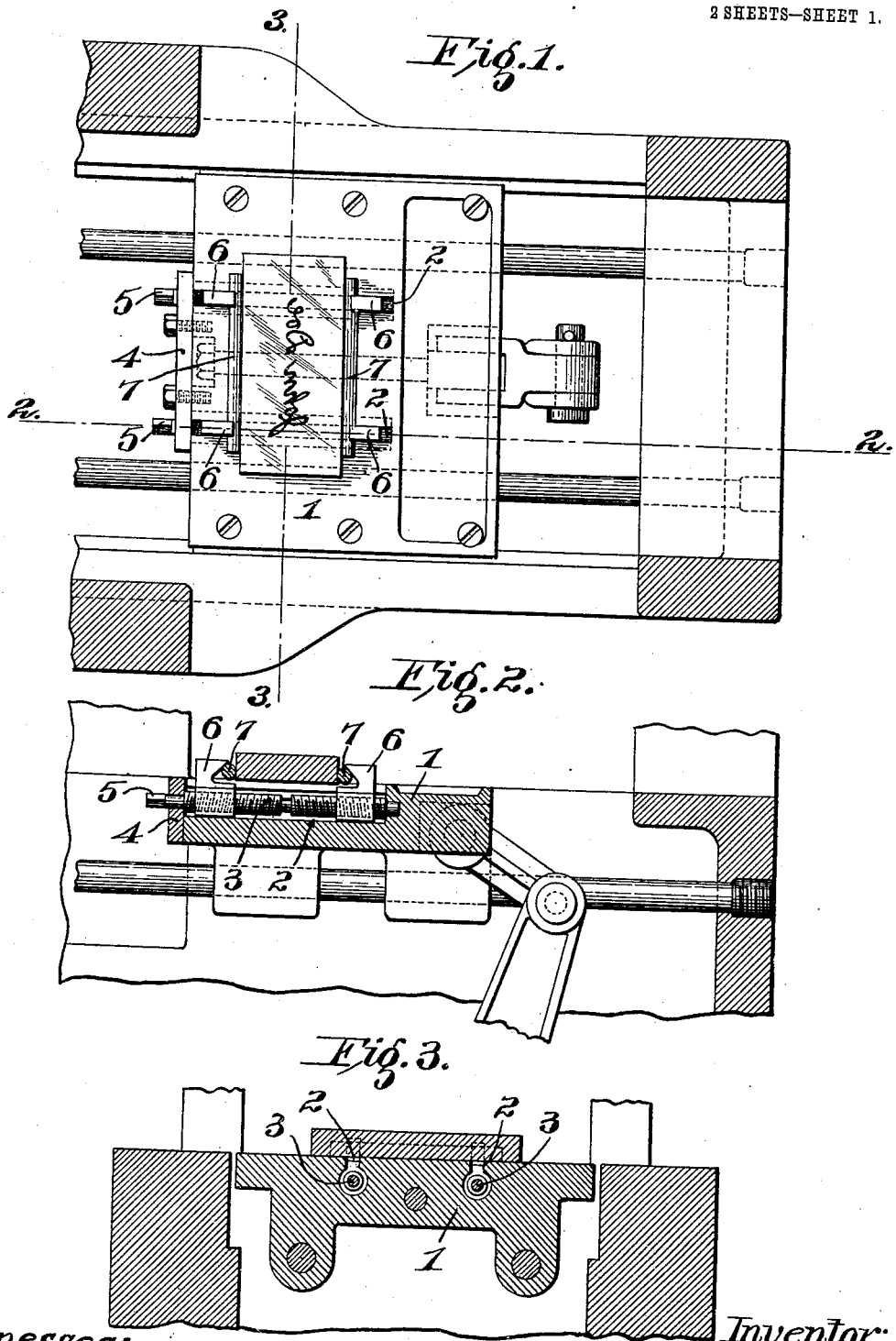

930,147.

Patented Aug. 3, 1909.

2 SHEETS—SHEET 2.

Witnesses:
Edgar J. Farmer
G. A. Pennington

Inventor:
Charles E. Brooks,
By
Attys

UNITED STATES PATENT OFFICE.

CHARLES E. BROOKS, OF ST. LOUIS, MISSOURI, ASSIGNOR TO B. ROTH TOOL COMPANY, OF ST. LOUIS, MISSOURI, A CORPORATION OF MISSOURI.

CHUCK.

No. 930,147.  Specification of Letters Patent.  Patented Aug. 3, 1909.

Original application filed March 31, 1908, Serial No. 424,308. Divided and this application filed September 12, 1908. Serial No. 452,754.

*To all whom it may concern:*

Be it known that I, CHARLES E. BROOKS, a citizen of the United States, and a resident of the city of St. Louis and State of Missouri, have invented a new and useful Improvement in Chucks, of which the following is a specification.

The subject matter of the present invention is divided out of an application for Letters Patent for an improvement in embossing and printing presses, No. 424,308 filed by me March 31, 1908.

The present invention relates to a chuck for general use but more particularly adapted for a die carrier.

It has for its principal objects to facilitate the centering and fastening of the plate or die on the carrier, to hold the plate or die with greater security, to overcome the tendency of the die to buckle, and to secure other advantages hereinafter appearing.

The invention consists principally in undercutting the adjacent faces of clamping jaws to receive cylindrical rods by means of which the pressure on the clamping jaws is transmitted inwardly and downwardly to bind the side edges of the die or plate.

Figure 4:
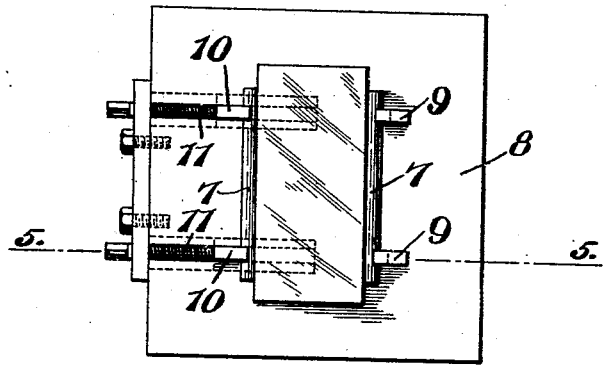
Figure 5:
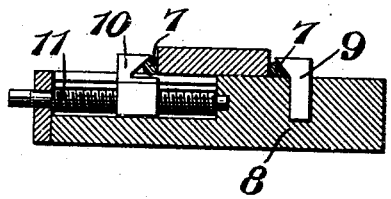
Figure 6:
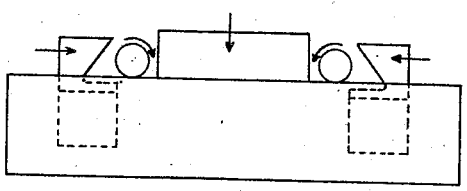

In the accompanying drawing, which forms part of this specification, and wherein like symbols refer to like parts wherever they occur, Figure 1 is a plan view of a die carrier embodying my invention; Fig. 2 is a longitudinal section on line 2—2 of Fig. 1; Fig. 3 is a cross section on line 3—3 of Fig. 1; Fig. 4 is a plan view of a modification of the chuck or work holder; Fig. 5 is a longitudinal section on line 5—5 of Fig. 4; Fig. 6 is a diagram illustrating the action of the device.

In the construction illustrated in the accompanying drawing, the body portion 1 of the chuck is the die carrier of an embossing and printing press of the type more fully illustrated in my application for Letters Patent therefor No. 424,308 filed by me March 31, 1908. In this die carrier or body portion of the chuck are two parallel slots or grooves 2 which extend from the rear portion to the front edge thereof. Extending lengthwise of each of these slots is a screw 3 whose rear end is swiveled or stepped in a socket provided therefor in the body of the carrier. The front portion of said screw is journaled in a hole provided therefor in a face plate 4 mounted on the front end of said die carrier. The screw projects through said face plate and its projecting end 5 is squared to coöperate with a key or other means for turning it. The body portion of each screw is provided with reversed threads, that is, a right hand screw at one side of the middle and a left hand screw on the other side. On each thread of the screw is a threaded locking member or jaw 6. Each of the threaded jaws has a portion which extends upwardly beyond the surface of the body of the die carrier, and the inner face of this upwardly extending portion is undercut so as to form triangular grooves in said threaded jaws. By this arrangement, the turning of a screw has the effect of moving the threaded jaws toward or away from each other to thereby act as a means for clamping the die plate in position. For the purpose of clamping the die in position, the undercut jaws are separated and the die is placed on the die carrier between the clamping jaws. A short round rod 7 is then laid along each side of the die, said rods being of such diameter that a diametral line drawn from its point of tangency with the inclined surface of the clamping jaw will have a considerable downward inclination. By this arrangement, the tightening of the double threaded screws tends to roll said rods toward the die and exerts a downward as well as a horizontal force against the die, whereby the jaws of said die are firmly clamped against the supporting carrier.

While the accompanying drawing illustrates my invention applied to a die carrier, it is obvious that it is applicable for general use as a work holding clutch. When used as a die holder in an embossing and printing press, the double-threaded screws serve to center or position the die as well as to fasten it. In ordinary machine tools, it is frequently desirable to have one of the clamping jaws fixed or stationary, as illustrated in Fig. 5. In this case, any suitable means may be used for actuating the movable jaw. For instance, as illustrated in Figs. 4 and 5, the chuck comprises a base or body portion 8. On this body portion is mounted a pair of fixed jaws 9 and opposite thereto is mounted a pair of movable jaws 10. The adjacent or inner faces of the jaws are undercut on an incline similarly to the jaws hereinbefore described, so as to act upon the rods or rotatable elements 7. The movable jaws are screw-threaded to fit upon the actuating screws 11 which extend lengthwise in slots in the body portion 8.

In securing the work in this modification of the chuck, the action is similar to that hereinbefore described. The movable jaws are moved away from the fixed jaws a distance to place the die, plate or other work between the jaws and the rods are then placed in position, after which the movable jaws are moved inwardly until the rods bind.

Obviously, the invention is applicable to ordinary chucks or work holders for milling and other metal working machines, it being only necessary to undercut the adjacent faces of the clamping jaws, and the device admits of considerable modification without departing from my invention. Therefore, I do not wish to be limited to the exact constructions and arrangements shown.

What I claim as my invention and desire to secure by Letters Patent is:

1. A chuck comprising a body portion, relatively movable clamping jaws mounted thereon, and cylindrical rods, said jaws having their inner faces undercut to bear downwardly and inwardly against said rods.

2. A chuck comprising a body portion, double threaded screws swiveled thereon, a pair of clamping jaws threaded on each screw, and cylindrical rods, said jaws having their inner faces undercut to bear downwardly and inwardly against said rods.

3. A die carrier comprising a body member having slots therein, double-threaded screws in each slot, notched clamping jaws having an inclined undercut portion, and locking rods loosely mounted in said notches.

4. A die carrier comprising a body member having slots therein, clamping jaws notched to form inclined undercut portions, rods loosely mounted in such notches, and means for moving said jaws to force said rods against the sides of said die plate.

5. A chuck comprising a body portion, relatively movable clamping elements mounted thereon, and rotatable elements adapted to be inserted between said clamping elements and the work to be held, said clamping elements having their inner faces undercut to bear downwardly and inwardly against said rotatable elements.

6. A chuck comprising a body portion, relatively movable clamping elements mounted thereon, rotatable elements adapted to be inserted between said clamping elements and the work to be held, said clamping elements having their inner faces undercut to bear downwardly and inwardly against said rotatable elements, and means for securing said clamping elements in position.

In testimony whereof I have signed my name to this specification in the presence of two subscribing witnesses this 1st day of September, 1908.

CHARLES E. BROOKS.

Witnesses:
G. A. PENNINGTON,
J. B. MEGOWN.